(12) United States Patent
Arpac et al.

(10) Patent No.: US 6,620,514 B1
(45) Date of Patent: Sep. 16, 2003

(54) NANOSTRUCTURED FORMS AND LAYERS AND METHOD FOR PRODUCING THEM USING STABLE WATER-SOLUBLE PRECURSORS

(75) Inventors: Ertugrul Arpac, Antalya (TR); Gerhard Jonschker, Spiesen-Elversberg (DE); Hermann Schirra, Saarbruecken (DE); Helmut Schmidt, Saarbruecken-Guedingen (DE)

(73) Assignee: Institut für Neue Materialien gem. GmbH, Saarbrücken (DE)

(*) Notice: Subject to any disclaimer, the term of this patent is extended or adjusted under 35 U.S.C. 154(b) by 0 days.

(21) Appl. No.: 09/647,971

(22) PCT Filed: Apr. 8, 1999

(86) PCT No.: PCT/EP99/02396

§ 371 (c)(1),
(2), (4) Date: Oct. 6, 2000

(87) PCT Pub. No.: WO99/52964

PCT Pub. Date: Oct. 21, 1999

(30) Foreign Application Priority Data

Apr. 9, 1998 (GB) .......................................... 198 16 136

(51) Int. Cl.[7] .................. B32B 9/04; C01B 33/141; C08G 79/20; C08G 79/58; C08L 83/04
(52) U.S. Cl. ............. 428/447; 106/287.16; 106/287.17; 106/490; 427/164; 428/405; 516/80; 516/86; 516/90; 516/93
(58) Field of Search .............. 516/80, 86, 90, 516/93, 100, 111; 106/287.16, 490, 287.17; 501/12; 428/405, 447; 427/164, 219

(56) References Cited

U.S. PATENT DOCUMENTS

| | | | | |
|---|---|---|---|---|
| 3,707,397 A | * | 12/1972 | Gagnon | 427/164 X |
| 3,834,924 A | * | 9/1974 | Grillo | |
| 3,850,971 A | * | 11/1974 | Termin et al. | 516/100 X |
| 4,799,963 A | * | 1/1989 | Basil et al. | 106/287.16 X |
| 4,814,017 A | * | 3/1989 | Yoldas et al. | 106/287.16 X |
| 5,013,788 A | * | 5/1991 | Nagashima et al. | 106/287.16 X |
| 5,164,003 A | * | 11/1992 | Bosco et al. | 106/287.16 X |
| 5,250,322 A | * | 10/1993 | Takahashi et al. | 106/287.16 X |
| 5,322,888 A | * | 6/1994 | Kato et al. | 106/287.16 X |
| 5,789,476 A | * | 8/1998 | Iryo et al. | 106/287.16 X |
| 5,814,137 A | * | 9/1998 | Blohowiak et al. | 516/90 X |
| 5,873,931 A | * | 2/1999 | Scholz et al. | 516/93 X |
| 5,928,127 A | * | 7/1999 | Tanuma | 516/93 |
| 5,958,115 A | * | 9/1999 | Böttcher et al. | 516/111 X |
| 6,245,833 B1 | * | 6/2001 | Kang et al. | 106/287.17 X |
| 6,358,612 B1 | * | 3/2002 | Bier et al. | 106/287.16 X |

FOREIGN PATENT DOCUMENTS

| | | | | |
|---|---|---|---|---|
| EP | 0 263 428 | * | 4/1988 | |
| EP | 0 486 469 | * | 5/1992 | |
| WO | WO98/40444 | * | 9/1998 | |

OTHER PUBLICATIONS

Database WPI Derwent Publ. Ltd., London, GB; AN 85–265863 XP 002115369 & JP 60 177079A (Toshiba) Sep. 1985.*

* cited by examiner

Primary Examiner—Richard D. Lovering
(74) Attorney, Agent, or Firm—Heller Ehrman White & McAuliffe LLP

(57) ABSTRACT

A process for preparing a composition for producing nanostructured mouldings and layers comprises contacting an aqueous and/or alcoholic sol of a compound of an element selected from silicon sand metals of the main groups and transition groups of the Periodic Table with species possessing hydrolysable alkoxy groups and comprising at least one organically modified alkoxysilane or a precondensate derived therefrom, under conditions which lead to (further) hydrolysis of the species, and subsequent removal of the alcohol formed and any alcohol already present originally. The process is characterized in that the alcohol is removed in an amount such that the residual alcohol content of the composition is not more than 20% by weight.

18 Claims, No Drawings

NANOSTRUCTURED FORMS AND LAYERS AND METHOD FOR PRODUCING THEM USING STABLE WATER-SOLUBLE PRECURSORS

This application is a 371 of International Application No. PCT/EP99/02396, filed Apr. 8, 1999.

The present invention relates to nanostructured mouldings and layers and to their preparation via stable water-soluble precursors, and in particular to nanostructured mouldings and layers suitable for optical purposes.

In the literature, processes for preparing transparent materials comprising organic/inorganic composites, using water-containing precursors, have already been described for coating purposes.

In particular, JP-A-53-6339 describes the synthesis of a composite starting from a reactively organically modified silane and an inertly organically modified silane and conducting hydrolysis in the presence of aqueous silica sol and phoshoric acid as hydrolysis catalyst. The alcohol formed in the condensation reaction is not removed.

JP-A-63-37168 describes the synthesis of a composite from free-radically crosslinking, acrylate-based monomers dispersed in an aqueous medium and from organically modified silanes, the organic radical of these silanes likewise constituting, a free-radically crosslinking system, in the presence of colloidal silica and nonionic surfactants. Hydrolysis and condensation reactions are conducted in a separate process step. Here again, the alcohol formed in the condensation reaction is not removed.

A similar description is contained in JP-A-63-37167 for a system wherein the silane component possesses cationically crosslinking radicals.

U.S. Pat. No. 5,411,787 describes the synthesis of a composite from polymeric binders dispersed in water, at least one aminosilane component and colloidal particles having a size of less than 20 nm. In this case too, the alcohol formed by the hydrolysis of the silane is not removed.

U.S. Pat No. 4,799,963 describes the preparation of silane-based composites into which, additionally, colloidal silica or nanoscale cerium oxide is incorporated.

The cited literature references contain no indications concerning the mechanism of action and, moreover, little information on the pot life of the systems they describe. Likewise, in the majority of cases, there is a lack of information on residual solvent contents, although a mathematical reworking of the syntheses suggests residual solvent contents of more than 10% by volume.

On the basis of the prior art as described, an investigation was carried out into the extent to which a reduction in the water sensitivity, i.e., in the progress of the hydrolysis and condensation reaction, is achievable through controlled coating of colloidal systems with functional silanes, and into the extent to which such systems may be used to prepare stable systems for the production of mouldings and layers, which are suitable, inter alia, for industrial application.

The object of the present invention, therefore, was to provide a process for preparing nanostructured mouldings and layers, preferably those suitable for optical purposes, via stable water-soluble intermediates.

In accordance with the invention it has been found that aqueous, electrostatically stabilized (and hence extremely concentration-sensitive) colloidal suspensions with reactive monomeric or oligomeric components (silanes or precondensates thereof) may be applied by coating and as a-consequence do not display, the course of concentration, the effect described by Stern (Z. Elektrochem., 508 (1924)) of the aggregation of two particles of like charge as they approach one another, and in particular do not display the chemical reactions, which otherwise proceed spontaneously, between reactive surface groups of the two particles. The concentration and shifting of the reaction equilibrium towards the product side, with formation of the surface condensates, is achieved by means of the removal, performed under reduced pressure, of the alcohol formed in the condensation reaction (generally methanol or ethanol), resulting in a combination of very high storage stability of the condensates (>14 days) with relatively low residual solvent contents (generally not more than 20% by weight and in particular not more than 10% by weight).

By virtue of the reversibility of the surface modifier/particle bonding (e.g. hydrogen bonding or metal-oxygen bonding (—Al—O—Si—, —Ti—O—Si—, etc., see e.g. Chem. Mat. 7 (1995), 1050-52)) the process described above may be reversed when heat is supplied, so that the particles are able to crosslink, accompanied by solidification. Further reaction may also take place by way of appropriately selected organic groups on the surface modifier (e.g. reaction of these groups with one another).

In this way it is possible to react, for example,. aqueous sols, such as boehmite, $TiO_2$, $ZrO_2$ or $SiO_2$ sols, but also other aqueous sols of compounds of metals of the main groups and transition groups of the Periodic Table, with organically modified alkoxysilanes in such a way that stripping of the solvent and, if desired, subsequent dispersal of the liquid residue in water produces clear solutions which are stable over a relatively long period of time. This stripping of the solvent (alcohol) is necessary in order to take the reaction of the coating of the particles with the organically modified alkoxysilanes to a point where a hydrolysis- and condensation-stable liquid system is produced. Using customary techniques, these systems may be employed, for example, for coating purposes and, depending on the functional group on the organically modified alkoxysilane, may be cured thermally or photochemically with the aid, if desired, of appropriate catalysts. In the case of thermal curing, inorganic networks are formed, and if appropriate organic groups are used organic linkages are formed in parallel thereto as well. The resultant nanocomposites are notable for high transparency. If used as a layer, they exhibit good adhesion to a very large number of substrates, and extremely high scratch resistance.

The present invention accordingly provides a process for preparing a composition for producing nanostructured mouldings and layers which comprises contacting an aqueous and/or alcoholic sol of a compound of an element selected from silicon and metals of the main groups and the transition groups of the Periodic Table with species possessing hydrolysable alkoxy groups and comprising at least one organically modified alkoxysilane or a precondensate derived therefrom, under conditions which lead to (further) hydrolysis of the species, and subsequent removal of the alcohol formed and any alcohol already present originally, and is characterized in that the alcohol is removed in an amount such that the residual alcohol content of the composition is not more than 20% by weight, preferably not more than 15% by weight and, in particular, not more than 10% by weight.

The present invention also provides the compositions obtainable by the above process and for their use for producing nanostructured mouldings and substrates provided with nanostructured layers.

The process of the invention differs from similar processes of the prior art in particular by virtue of the fact that a considerable fraction of the solvent (alcohol) present in the system is removed from the system. This shifts the hydrolysis and condensation equilibrium towards the product side and brings about stabilization of the corresponding liquid system. In general, at least 30% by weight, in particular at least 50% by weight and preferably at least 70% by weight of the theoretical amount of alcohol formed by hydrolysis of alkoxy groups is removed. With particular preference, at least 80% by weight, and more preferably still 90% by weight, of this alcohol is removed. This calculation does not include any alcohol present originally (e.g. from the sol starting material; it is assumed that the corresponding amount of alcohol is removed 100%), but does include the amount of alcohol already formed during the preparation of any precondensates used. As a result, it is generally ensured that 10–80% (preferably 20–50%) of all present condensable (hydrolysed) groups of the silane undergo a condensation reaction.

The alcohol is removed from the reaction system preferably under reduced pressure, in order to permit excessive thermal loading of the system to be avoided. In general, when removing the alcohol from the system, a temperature of 60° C., in particular 50° C. and with particular preference 40° C., should not be exceeded.

In the text below, the starting materials used in the process of the invention are described in more detail.

The sol which is used may be an aqueous sol, an alcoholic sol or an aqueous/alcoholic sol. Preference is given to using simple aqueous sols. If a sol containing alcohol is used, the alcohol in question preferably has 1 to 4 carbon atoms, i.e. is methanol, ethanol, propanol, isopropanol or one of the butanols.

The sol of the invention, comprises one or more compounds (preferably one compound) of one or more elements selected from silicon and the main-group and transition-group metals. The main-group and transition-group metals preferably comprise those from the third and fourth main groups (especially Al, Ga, Ge and Sn) and the third to fifth transition groups (especially Ti, Zr, Hf, V, Nb and Ta) of the Periodic Table. Alternatively, other metal compounds may lead to advantageous results, such as those of Zn, Mo and W, for example.

The corresponding element compounds preferably comprise oxides, oxide hydrates, sulphides, selenides or phosphates, particular preference being given to oxides and oxide hydrates. Accordingly, the compounds present in the sol used in accordance with the invention comprise in particular (and preferably) $SiO_2$, $Al_2O_3$, AlOOH (especially boehmite), $TiO_2$, $ZrO_2$ and mixtures thereof.

The Sol used in the process of the invention generally has a solids content of from 5 to 50% by weight, preferably from 10 to 40 and with particular preference from 15 to 30% by weight.

The species containing hydrolysable alkoxy groups for use in the process of the invention include at least one organically modified alkoxysilane and/or a precondensate derived therefrom. Organically modified alkoxysilanes which are preferred in accordance with the invention are those of the general formula (I):

$$R'_{4-x}Si(OR)_x \quad (I)$$

in which the radicals R are identical or different from one another (preferably identical) and are unsubstituted or substituted (preferably unsubstituted) hydrocarbon groups having 1 to 8, preferably 1 to 6 and with particular preference 1 to 4, carbon atoms (especially methyl or ethyl), the radicals R', which are identical or different from one another, are each an unsubstituted or substituted hydrocarbon group having 1 to 20 carbon atoms and x is 1, 2 or 3.

Examples of radicals R' in the above formula are alkyl, alkenyl, aryl, alkylaryl, arylalkyl, arylalkenyl and alkenylaryl radicals (preferably having in each case 1 to 12 and in particular 1 to 8 carbon atoms and including cyclic forms) which may be interrupted by oxygen, sulphur, nitrogen atoms or the group NR" (R"=hydrogen or C alkyl) and may carry one or more substituents from the group of the halogens and of the unsubstituted or substituted amino, amide, carboxyl, mercapto, isocyanato, hydroxyl, alkoxy, alkoxycarbonyl, acryloyloxy, methacryloyloxy or epoxy groups.

Among the above alkoxysilanes of the general formula (I), there is with particular preference at least one in which at least one radical R' possesses a group which is able to undergo an addition-polymerization (including polyaddition) or condensation-polymerization reaction. This group capable of addition-polymerization or condensation-polymerization reaction preferably comprises an epoxy group or (preferably activated) carbon-carbon multiple bonds (especially double bonds), a (meth)acrylate group being a particularly preferred example of the last-mentioned groups.

Accordingly, particularly preferred organically modified alkoxysilanes of the general formula (I) for use in the present invention are those in which x is 2 or 3, and in particular 3, and one radical (the only radical) R' is ω-glycidyloxy-$C_{2-6}$ alkyl or ω(meth)acryloyloxy-$C_{2-6}$ alkyl.

Specific examples of such silanes are 3-glycidyloxypropyltri(m)ethoxysilane, 3,4-epoxybutyltrimethoxysilane and 2-(3,4-epoxycyclohexyl)ethyltrimethoxysilane and also 3-(meth)acryloyloxypropyltri(m)ethoxysilane and 2-(meth)acryloyloxyethyltri(m)ethoxysilane. Further examples of suitable compounds in which x is 1 or 2 are 3-glycidyloxypropyldimethyl(m)ethoxysilane, 3-glycidyloxypropylmethyldi(m)ethoxysilane, 3-(meth)acryloyloxypropylmethyldi(m)ethoxysilane and 2-(meth)acryloyloxyethylmethyldi(m)ethoxysilane.

Examples of further alkoxysilanes which may be used as they are if desired but preferably in combination with alkoxysilanes containing the above groups capable of addition-polymerization or condensation-polymerization reaction are tetramethoxysilane, tetraethoxysilane, tetra-n-propoxysilane, tetra-n-butoxysilane, cyclohexyltrimethoxysilane, cyclopentyltrimethoxysilane, ethyltrimethoxysilane, phenylethyltrimethoxysilane, phenyltrimethoxysilane, n-propyltrimethoxysilane, cyclohexylmethyldimethoxysilane, dimethyldimethoxysilane, diisopropyldimethoxysilane, phenylmethyldimethoxysilane, phenylethyltriethoxysilane, phenyltriethoxysilane, phenylmethyldiethoxysilane and phenyldimethylethoxysilane.

Especially if the nanostructured mouldings and layers of the invention are to be given dirt and water repellency properties and a low surface energy, it is possible together with the organically modified alkoxysilane to use silanes possessing directly, silicon-attached fluorinated alkyl radicals having at least 4 carbon atoms (and preferably at least 3 fluorine atoms), with the carbon atoms positioned α and β to the silicon preferably carrying no fluorine atoms, examples being (tridecafluoro-1,1,2,2-tetrahydrooctyl)methyldiethoxysilane, (tridecafluoro-1,1,2,2-tetrahydrooctyl)triethoxysilane, (heptadeca-fluoro-1,1,2,2-tetrahydrodecyl)methyldiethoxysilane and (heptadecafluoro-1,1,2,2-tetrahydrodecyl)triethoxysilane.

Of course, in addition to the above silanes (especially the organically modified silanes), the species with hydrolysable alkoxy groups that are used in accordance with the invention may further comprise species other than silanes. Examples of such non-silane species are alkoxides (preferably with $C_{1-4}$ alkoxy groups) of aluminium, titanium zirconium, tantalum, niobium, tin, zinc, tungsten, germanium and boron. Specific examples of such compounds are aluminium sec-butylate, titanium isopropoxide, titanium propoxide, titanium butoxide, zirconium isopropoxide, zirconium propoxide, zirconium butoxide, zirconium ethoxide, tantalum ethoxide, tantalum butoxide, niobium ethoxide, niobium butoxide, tin t-butoxide, tungsten(VI) ethoxide, germanium ethoxide, germanium isopropoxide and di-t-butoxyaluminotriethoxysilane.

Especially in the case of the relatively reactive alkoxides (e.g. those of Al, Ti, Zr etc.), it may be advisable to use them in complexed form, examples of suitable complexing agents being, for example, unsaturated carboxylic acids and β-dicarbonyl compounds, such as methacrylic acid, acetylacetone and ethyl acetoacetate, for example. If species containing hydrolysable alkoxy groups, other than the organically modified alkoxysilanes, are used, then the molar ratio of the organically modified alkoxysilanes to the other species is preferably at least 2:1, in particular at least 5:1 and with particular preference at least 10:1.

If use is made in the process of the invention, as is preferred, of organically modified alkoxysilanes containing a group capable of addition-polymerization or condensation-polymerization reaction, then it is preferred to incorporate into the corresponding composition, in addition, a starter component, the molar ratio of starter to organic group generally not exceeding 0.15:1.

Where, for example, silanes of the general formula (I) containing epoxy groups are used, suitable starters include, in particular, imidazoles, amines, acid anhydrides and Lewis acids. If imidazoles are to be used, 1-methylimidazole is particularly preferred. Other preferred examples of imidazole starters are 2-methylimidazole and 2-phenylimidazole. Examples of the starters from the group of the primary, secondary and tertiary amines are ethylenediamine, diethylenetriamine, triethylenetetramine, 1,6-diaminohexane, 1,6-bis(dimethylamino)hexane, tetramethylethylenediamine, N,N,N',N",N"-pentamethyldiethylenetiramine, 1,4-diazabicyclo[2.2.2] octane, cyclohexane-1,2-diamine, 2-(aminomethyl)-3,3,5-trimethylcyclopentylamine, 4,4'-diaminocyclohexylmethane, 1,3-bis(aminomethyl) cyclohexane, bis(4-amino-3-methylcyclohexyl)methane, 1,8-diamino-p-menthane, 3-(aminoethyl)-3,3,5-trimethylcyclohexylamine (isophoronediamine), piperazine, piperidine, urotropine, bis(4-aminophenyl)methane and bis (4-aminophenyl) sulphone. The amines used as starters may also be functionalized with silanes. Examples are N-(2-aminoethyl)-3-aminopropyltriethoxysilane, N-(2aminoethyl)-3-aminopropyltrimethoxysilane, aminopropyltrimethoxysilane and aminopropyltriethoxysilane. In addition, boron trifluoride adducts of amines, such as $BF_3$-ethylamine, for example, may be used. Furthermore, organic crosslinking may be brought about with the aid of acid anhydrides (preferably in combination with tertiary amines), such as ethylbicyclo[2.2.1]heptene-2,3-dicarboxylic anhydride, hexahydronaphthalenedicarboxylic anhydride, phthalic anhydride, 1,2-cyclohexanedicarboxylic anhydride, and also [3-(triethoxysilyl)propyl]succinic anhydride.

Catalysts additionally suitable for the crosslinking of epoxy groups in the present case are (optionally prehydrolysed) alkoxides of aluminium, titanium and zirconium, e.g. $Al(OC_2H_4OC_4H_9)_3$, and organic carboxylic acids, such as propionic acid, for example.

In the case of the use of silanes of the above formula (I) which possess (meth)acrylate groups, a conventional thermal polymerization catalyst or a conventional photopolymerization catalyst may be added to the composition. Examples of thermal catalysts used with preference are azobisisobutyronitrile, diacyl peroxides (e.g. dibenzoyl peroxide and dilauroyl peroxide), peroxydicarbonates, alkyl peresters, perketals, alkyl or aryl peroxides, ketone peroxides and hydroperoxides.

It is of course also possible to incorporate into the composition purely organic components which react with reactive groups on the silanes of the general formula (I) and so are able to bring about further crosslinking in the course of curing. For example, in the case of the use of silanes containing (meth)acrylate group, specific examples of useful crosslinking agents are bisphenol A bisacrylate, bisphenol A bismethacrylate, trimethylolpropane triacrylate, trimethylolpropane trimethacrylate, neopentyl glycol dimethacrylate, neopentyl glycol diacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, 2,2,3,3-tetrafluoro-1,4-butanediol diacrylate and dimethacrylate, 1,1,5,5-tetrahydroperfluoropentyl-1,5-diacrylate and dimethacrylate, hexafluorobisphenol A diacrylate and dimethacrylate, octafluoro-1,6-hexanediol diacrylate and dimethacrylate, 1,3-bis(3-methacryloyloxypropyl)tetrakis(trimethylsiloxy) disiloxane, 1,3-bis(3-acryloyloxypropyl)tetrakis(trimethylsiloxy) disiloxane, 1,3-bis(3-methacryloyloxypropyl) tetramethyldisiloxane and 1,3-bis (3-acryloyloxypropyl) tetramethyldisiloxane.

If nanostructured mouldings and layers having hydrophilic properties are desired, it is possible, for example, to incorporate into the composition of the invention, additionally, components which lead to such hydrophilic properties For this purpose it is possible to use components covalently bondable to the inorganic matrix (e.g. a component with a free hydroxyl group, such as 2-hydroxyethyl (meth)acrylate or a hydrophilic component which is freely movable in the matrix (e.g. a surfactant) or a combination of the two.

The conditions to be used in accordance with the invention, leading to (further) hydrolysis of the species containing hydrolysable alkoxy groups and/or the corresponding precondensates, preferably comprise the presence of at least 0.5 mol of $H_2O$ per hydrolysable alkoxy group. This amount of water is generally already present by virtue of the water in the sol. If this is not the case, the corresponding amount of water should be added separately.

It is more preferable if a catalyst for the hydrolysis (and condensation) of the alkoxy groups is present. Preferred catalysts for this purpose are acidic catalyts, e.g. aqueous (mineral) acids such as HCl, for example.

The proportion of the starting materials used (sol and species containing hydrolysable alkoxy groups) is preferably chosen such that in the final moulding or in the final layer (after curing) the solids content originating from the sol makes up from 1 to 50% by weight and in particular from 5 to 30% by weight of the moulding or layer, respectively.

The method of contacting the aqueous and/or alcoholic sol with the species containing hydrolysable alkoxy groups under conditions which lead to hydrolysis of the species containing alkoxy groups is familiar to the skilled worker and is elucidated further in the examples below. Following the removal of the solvent (alcohol) from the composition (which generally means that from 10 to 80% and in particular from 20 to 50% of the initial hydrolysable alkoxy groups have undergone a condensation reaction), it may prove to be advantageous for certain purposes to adjust the resultant composition to an appropriate viscosity by adding water. Preferably, the viscosity of the composition, especially for coating purposes, is below 5000 mPas, in particular below 3000 mPas.

To produce nanostructured mouldings and substrates provided with nanostructured layers, with the aid of the composition of the invention, this composition is either introduced into a mould or applied to a substrate and subsequently—if desired after drying beforehand at room temperature or at slightly elevated temperature, especially in the case of the production of layers—thermal (and additionally, if desired, photochemical) curing is conducted. In the case of the production of layers, all conventional coating techniques may be used, e.g. dipping, flowcoating, rolling, spraying, knife coating, spincoating or screen printing.

The curing temperature is generally, in the range from 90° C. to 300° C., in particular from 110° C. to 200° C., and in the case of layer production is also dependent, in particular, on the temperature stability of the substrate to be coated.

As already mentioned at the outset, the composition of the invention is suitable for coating a very wide variety of substrates and on those substrates, even without surface treatment, in many cases displays very good adhesion and extremely high scratch resistance. Particularly preferred substrates for layer production are glass, transparent and non-transparent plastics, and metals. Examples of suitable plastics are polycarbonate, poly(meth)acrylates, polystyrene, polyvinyl chloride, polyethylene terephthalate, polypropylene and polyethylene, while a preferred metal substrate is aluminium.

Accordingly, the compositions obtainable in accordance with the invention are suitable for a large number of applications. Examples of such applications are, in particular, the following:

Coating to increase scratch and abrasion resistance:
topcoats of household articles and means of transport
transparent and non-transparent polymer components
metallic substrates
ceramic and glass substrates
Coating to improve the abrasion and corrosion resistance of precious and non-precious metals:
Mg: engine blocks, spectacle frames, sports equipment, wheel rims, transmission casings
Al: bodywork of means of transport, wheel rims, facing elements, furniture, heat exchangers
Steel: compression moulds for producing components, sanitary fittings
Zn: roof constructions, firearms, airbag accelerometer masses
Cu: door fittings, heat exchangers, washbasins
Coatings for improving cleaning behaviour: Concerning examples for this application, reference may be made to DE-A-19544763.
Coatings for improving the demoulding of components and for reducing adhesion:
Metal and polymer conveyor belts
Rolls for polymerization reactions
Compression moulds for producing polystyrene components
Anti-graffiti coatings on topcoats and facings
Coatings for anti-condensation effect:
Glasswork of means of transport
Spectacle lenses
Mirrors (e.g. bathroom, automotive rearview and cosmetic mirrors)
Optical components (e.g. spectroscopy mirrors and laser prisms)
Elements for encapsulation (e.g. housings for meteorological instruments)
Coatings for anti-reflection properties:
Polymer or glass covers of display elements (e.g. automotive dashboards, display window glazing)
Coatings for food-related applications:
Diffusion barrier layers (preventing the diffusion of, for example, gases, acetaldehyde, lead ions or alkali metal ions, odorants and flavours)
Coating of hollow glass articles:
Coatings of beverage bottles for increasing the bursting pressure
Colouring of colourless glass by means of a coating
Production of optical mouldings and self-supporting films:
Nanocomposite spectacle lenses
Scratch- and abrasion-resistant packaging films The examples which follow serve to elucidate further the present invention. In all of these examples, the solvent formed by the hydrolysis (ethanol) was removed to an extent of at least approximately 95%.

EXAMPLE 1

27.8 g (0.1 mol) of (3-glycidyloxypropyl)triethoxysilane (GLYEO) were admixed with 27.8 g of silica sol (30% strength by weight aqueous solution of $SiO_2$, Levasile® 200S from Bayer). The mixture was subsequently stirred at room temperature for 5 hours. Thereafter, the ethanol formed by hydrolysis was removed by distillation (rotary evaporator, maximum bath temperature 40° C.). The residue was admixed with 1.11 g (0.0005 mol) of N-(2-aminoethyl)-3-aminopropyltrimethoxysilane (DIAMO) and stirred at room temperature for one hour.

The resultant system was used to coat polycarbonate and aluminium sheets and also CR-39 lenses. The polycarbonate sheets had been pretreated by corona discharge. The coated polycarbonate and aluminium sheets were stored at room temperature for 30 minutes and then cured at 130° C. for 4 hours. The CR-39 lenses were stored at room temperature for 30 minutes and then cured at 90° C. for 4 hours.

EXAMPLE 2

Example 1 was repeated but using 3.05 g (0.001 mol) of [3-(triethoxysilyl)propyl]succinic anhydride (GF20) instead of DIAMO. Investigation of the abrasion resistance of polycarbonate sheets coated with this composition, by the Taber abrasion test (wheel material CS 10F, 1000 cycles, wheel load 500 g), gave a diffuse-light loss of 7%.

EXAMPLE 3

Example 1 was repeated but using a boehmite suspension (2.78 g of Disperal® P3 in 25 g of distilled water) instead of the silica sol.

EXAMPLE 4

Example 3 was repeated but using 3.78 g (0.01 mol) of Al(OEtOBu)$_3$ as the catalyst instead of DIAMO.

EXAMPLE 5

27.8 g (0.1 mol) of GLYEO were admixed with 27.8 g of the silica sol described in Example 1. The mixture was subsequently stirred at room temperature for 5 hours, followed by removal of the ethanol formed by hydrolysis, as described in Example 1. The residue was admixed with 2.84 g (0.01 mol) of TiO$_2$ sol, prepared as described below, and stirred at room temperature for one hour.

The TiO$_2$ sol was prepared by dissolving 28.42 g (0.1 mol) of tetraisopropyl orthotitanate (Ti(OiPr)$_4$) in 60 ml of isopropanol and adding concentrated hydrochloric acid to the solution in a molar ratio of 1:1. After 2 hours of stirring at room temperature, the volatile constituents were removed by a rotary evaporator and the residue was taken up in 70 ml of water.

EXAMPLE 6

139.0 g (0.5 mol) of GLYEO were mixed with 62.4 g (0.3 mol) of tetraethoxysilane (TEOS). The reaction mixture was admixed with an HCl-acidic boehmite suspension (12.82 g of nanoscale boehmite powder in 128.20 g of 0.1 N HCl solution) and stirred at room temperature for 5 hours. The ethanol formed by hydrolysis was removed by distillation as described in Example 1. Subsequently, 3.78 g (0.01 mol) of Al(OEtOBu)$_3$ were added to the mixture, followed by 1 hour of stirring at room temperature.

Polycarbonate plates pretreated by corona discharge and plasma-pretreated CR-39 lenses were coated with the composition thus prepared and cured thermally at 130 and, respectively, 90° C. for one hour.

EXAMPLE 7

29.0 g (0.1 mol) of 3-methacryloyloxypropyltriethoxysilane were admixed with 29.0 g of the silica sol described in Example 1 and stirred at room temperature for 16 hours. The mixture was subsequently admixed with 13.0 g (0.1 mol) of 2-hydroxyethyl methacrylate (as hydrophilic component:) and stirred at room temperature for 30 minutes. This was followed by distillative removal (as described in Example 1) of the alcohol formed by hydrolysis from the reaction mixture. 0.48 g of dibenzoyl peroxide (1 mol% based on double bonds present) was added to the concentrated reaction mixture.

The composition thus prepared was applied to polymethyl methacrylate sheets pretreated by corona discharge, and was cured thermally at 95° C. for 4 hours.

EXAMPLE 8

55.6 g of 3-glycidyloxypropyltriethoxysilane were admixed with 0.51 g of tridecafluoro-1,1,2,2-tetrahydrooctyl-l-triethoxysilane and stirred. The resultant mixture was admixed with 10.85 g of 0.1 N HCl (corresponding to the stoichiometric amount of water for the hydrolysis of the alkoxysilanes). After stirring at room temperature for 24 hours, 55.6 g of the silica sol described in Example 1 were added and the mixture was stirred at room temperature for 4 hours. The alcohol formed by hydrolysis was removed as described in Example 1 on a rotary evaporator (amount removed 26.4 g). Subsequently, 2.22 g of DIAMO were added and the mixture was stirred at room temperature for a further hour.

EXAMPLE 9

278.42 g of GLYEO was cohydrolysed with 10 g of a reaction product of 3-isocyanatopropyltriethoxysilane and polyethylene glycol 600, together with 54 g of 0.1 N HCl, with stirring at room temperature for 5 hours. The ethanol formed in the prehydrolysis was stripped off on a rotary evaporator (bath temperature 25° C., 30–40 mbar). Subsequently, 926 g of the silica sol described in Example 1 were, incorporated into this mixture with stirring, after which the mixture was stirred at room temperature for 16 hours. Thereafter, 11.12 g of DIAMO were added as starter and the mixture was stirred at room temperature for a further hour. Then 20 g of a silicone-based nonionic surfactant were added with vigorous stirring.

Float glass substrates coated with the resultant composition were cured in a drying oven at 130° C. for 4 hours.

EXAMPLE 10

Example 1 was repeated but using 1.32 g (0.005 mol) of trimethoxysilylpropyldiethylenetriamine. (TRIAMO) instead of DIAMO.

EXAMPLE 11

Example 1 was repeated but using 0.74 g (0.01 mol) of propionic acid as starter instead of DIAMO.

EXAMPLE 12

Example 1 was repeated but using 3.87 g (0.01 mol) of Al(OEtOBu)$_3$ as starter instead of DIAMO.

EXAMPLE 13

Example 1 was repeated but using 0.41 g (0.005 mol) of 1-methylimidazole as starter instead of DIAMO.

EXAMPLE 14

Example 1 was repeated but using, instead of DIAMO, 5.27 g (0.01 mol) of a mixture obtained by purifying 3-aminopropyltriethoxysilane (AMEO) with GF20 in a molar ratio of 1:1 with ice cooling.

EXAMPLE 15

Example 6 was repeated but using 95.5 g of the silica sol described in Example 1 instead of the HCl-acidic boehmite suspension, and increasing fivefold the amount of catalyst.

Polycarbonate sheets pretreated by corona discharge and plasma-pretreated CR-39 lenses were coated with the resultant composition and cured thermally at 130° C. and 90° C., respectively, for one hour.

EXAMPLE 16

27.8 g (0.1 mol) of GLYEO were admixed with 13.5 g of 0.1 N HCl and stirred at room temperature for 2 hours. 27.8 g of organosol (30% by weight SiO$_2$ in isopropanol, Bayer PPL 6454-6456) were added to this prehydrolysate, and the mixture was stirred at room temperature for 5 hours. Subsequently, the ethanol formed by hydrolysis and the isopropanol solvent were removed by distillation. The residue was admixed with 18.9 g of H$_2$O (pH 3.2). Subsequently, 1.11 g (0.0005 mol) of DIAMO were added with vigorous stirring and the mixture was stirred at room temperature for 1 hour.

The resultant composition was used to coat polycarbonate and aluminium sheets and also CR-39 lenses. The polycarbonate sheets had been pretreated by corona discharge. The coated polycarbonate and aluminium sheets were stored at room temperature for 30 minutes and then cured at 130° C. for 4 hours. The CR-39 lenses were stored at room temperature for 30 minutes and then cured at 90° C. for 4 hours.

EXAMPLE 17

139.0 g (0.5 mol) of GLYEO were mixed with 62.4 g (0.3 mol) of TEOS and admixed stoichiometrically with 0.1 N hydrochloric acid. The reaction mixture was stirred at room temperature for 16 hours. Subsequently, the ethanol formed by hydrolysis and condensation was removed by distillation. The concentrated reaction mixture was then admixed with an HCl-acidic boehmite suspension (12.82 g of boehmite powder in 128.8 g of 0.1 N HCl solution) and stirred at room temperature for 3 hours. 3.78 g (0.01 mol) of $Al(OEtOBu)_3$ were then added dropwise to the mixture. The coating material thus prepared was stirred at room temperature for approximately 4 hours.

Corona-pretreated polycarbonate sheets and plasma-pretreated CR-39 lenses were coated and cured thermally at 130° C. and, respectively, 90° C. for one hour.

EXAMPLE 18

139.0 g (0.5 mol) of GLYEO were mixed with 62.4 g (0.3 mol) of TEOS and admixed stoichiometrically with 0.1 N hydrochloric acid. The reaction mixture was stirred at room temperature for 16 hours. Subsequently, the ethanol formed by hydrolysis and condensation was removed by distillation. The concentrated reaction mixture was then admixed with a 30% by weight acidified silica sol solution (see Example 1) and stirred at room temperature for 3 hours. 18.9 g (0.05 mol) of $Al(OEtOBu)_3$ were then added dropwise to the mixture. The coating material thus prepared was stirred at room temperature for approximately 4 hours.

Corona-pretreated polycarbonate sheets and plasma-pretreated CR-39 lenses were coated and cured thermally at 130° C. and, respectively, 90° C. for one hour.

EXAMPLE 19

27.8 g (0.1 mol) of GLYEO were admixed with 0.51 g of fluorosilane (see, Example 8; 1 mol % with respect to GLYEO) and the mixture was stirred. The mixture was admixed with 5.46 g of 0.1 N HCl, corresponding to the stoichiometric amount of water for the hydrolysis. The mixture was subsequently stirred at room temperature for 24 hours. Subsequently, the alcohol formed by hydrolysis and condensation was removed on a rotary evaporator. The residue was admixed with 3.87 g (0.01 mol) of $Al(OEtOBu)_3$ and 27.8 g of acidified silica sol (see Example 1) and stirred at room temperature for 3 hours.

EXAMPLE 20

27.8 g (0.1 mol) of GLYEO were admixed with 0.255 g of fluorosilane (see Example 8; 0.5 mol % with respect to GLYEO) and the mixture was stirred. The mixture was admixed with 5.43 g of 0.1 N HCl, corresponding to the stoichiometric amount of water for the hydrolysis. The mixture was stirred at room temperature for 24 hours and then the alcohol formed by hydrolysis was removed on a rotary evaporator. The amount removed, approximately 13 g, corresponds to approximately 95%. The residue was dispersed with a boehmite suspension (2.78 g of Dispersal® P3 in 25 ml of 0.1 N hydrochloric acid solution), admixed with 1.89 g (0.005 mol) of $Al(OEtOBu)_3$ and stirred at room temperature for one hour.

What is claimed is:

1. A process for preparing a composition for producing a nanostructured moulding or layer, comprising the steps of:
    (a) contacting an aqueous and/or alcoholic sol of at least one compound of at least one element selected from the group consisting of silicon and the metals of the main groups and transition groups of the Periodic Table with at least one species possessing at least one hydrolyzable alkoxy group and comprising at least one organically modified alkoxysilane or a precondensate derived therefrom, under conditions which lead to hydrolysis of the at least one species; and
    (b) subsequently removing the total amount of any solvent alcohol already present originally and at least 30% by weight of the solvent alcohol that would be formed by the hydrolysis of all alkoxy groups originally present in the at least one species, in an amount such that the residual solvent alcohol content of the composition is not more than 20% by weight.

2. The process of claim 1, further comprising:
    (c) adding water to the composition to achieve an appropriate viscosity.

3. The process of claim 1 where the sol is an aqueous sol.

4. The process of claim 1 where the at least one compound constituting the sol is derived from at least one element selected from the group consisting of silicon and the metals of the third and fourth main groups and of the third through fifth transition groups of the Periodic Table.

5. The process of claim 1 where the at least one compound constituting the sol comprises at least one oxide, oxide hydrate, sulfide, selenide, or phosphate.

6. The process of claim 1 where the sol comprises a sol of $SiO_2$, $Al_2O_3$, $AlOOH$, $TiO_2$, $ZrO_2$, or a mixture thereof.

7. The process of claim 1 where the conditions which lead to hydrolysis of the at least one species possessing at least one hydrolyzable alkoxy group comprise the presence of at least 0.5 mol of $H_2O$ per hydrolyzable alkoxy group and a catalyst for the hydrolysis reaction.

8. The process of claim 1 where the amount of the sol is such that the sol solids content comprises from 1 to 50% by weight of the finished moulding or finished layer.

9. The process of claim 1 where the organically modified alkoxysilane comprises at least one compound of the formula $R'_{4-x}Si(OR)_x$ where:
    each R, which may be the same or different, is an unsubstituted or substituted hydrocarbon group having 1 to 8 carbon atoms,
    each R', which may be the same or different, is an unsubstituted or substituted hydrocarbon group having 1 to 20 carbon atoms, and
    x is 1, 2 or 3.

10. The process of claim 9 where:
    each R is a $C_{1-4}$ alkyl group,
    the or at least one R' possesses a group capable of an addition-polymerization or condensation-polymerization reaction, and
    x is 2 or 3.

11. The process of claim 10 where the group capable of an addition-polymerization or condensation-polymerization reaction is an epoxy group or a carbon-carbon multiple bond.

12. The process of claim 10 where the or at least one R' is an ω-glycidyloxy-$C_{2-6}$ alkyl group, an ω-acryloyloxy-$C_{2-6}$ alkyl group, or an ω-methacryloyloxy-$C_{2-6}$ alkyl group.

13. The process of claim 10 further comprising adding to the composition a catalyst for the addition-polymerization or condensation-polymerization reaction.

14. A composition for producing a nanostructured moulding or layer prepared by the process of claim 1.

15. A process for producing a nanostructured moulding or a substrate provided with a nanostructured layer, comprising:

(a) preparing a composition by the process of claim 1;

(b) introducing the composition into a mould or applying the composition to a substrate; and (c) thermally and optionally photochemically curing the composition to form the moulding or layer.

16. The process of claim 15 where the substrate is a glass, plastic, or-metal substrate.

17. A nanostructured moulding or a substrate provided with a nanostructured layer prepared by the process of claim 15.

18. An optical component comprising the nanostructured moulding or the substrate provided with a nanostructured layer of claim 17.

* * * * *